US006644987B2

United States Patent
Meleck

(10) Patent No.: US 6,644,987 B2
(45) Date of Patent: Nov. 11, 2003

(54) SURFACE MOUNTED RECEPTACLE ASSEMBLY

(75) Inventor: Michael Meleck, Winnipeg (CA)

(73) Assignee: Phillips & Temro Industries, Ltd., Winnipeg (CA)

( * ) Notice: Subject to any disclaimer, the term of this patent is extended or adjusted under 35 U.S.C. 154(b) by 0 days.

(21) Appl. No.: 10/010,385

(22) Filed: Dec. 6, 2001

(65) Prior Publication Data

US 2002/0070534 A1 Jun. 13, 2002

Related U.S. Application Data

(60) Provisional application No. 60/255,545, filed on Dec. 13, 2000.

(51) Int. Cl.$^7$ ............................................. H01R 13/648
(52) U.S. Cl. ........................................ 439/107; 439/571
(58) Field of Search ................................ 439/107, 502, 439/527, 553, 571, 573, 574, 575, 650, 654

(56) References Cited

PUBLICATIONS

Trace Engineering Receptacle; (4) pictures, date taken Dec. 8, 2000.

Trace Engineering Aftermarket Truck Inverter Installation Kits, publication date unknown, 2 pages. No date.

Phillips Qp$^3$ Shore Power System Advertisement, publication date unknown, 2 pages. No date.

*Primary Examiner*—Lynn Feild
*Assistant Examiner*—Thanh-Tam Le
(74) *Attorney, Agent, or Firm*—Harness, Dickey & Pierce, P.L.C.

(57) ABSTRACT

A surface mounted receptacle assembly for use in a motor vehicle having a cabin includes a cover, a mounting plate adapted to be mounted to the vehicle, a wire harness and a backing plate removably secured to the cover to conceal at least a portion of the wire harness wherein the cover is selectively attachable to the mounting plate.

23 Claims, 7 Drawing Sheets

SURFACE MOUNTED RECEPTACLE ASSEMBLY

CROSS-REFERENCE TO RELATED APPLICATIONS

This application claims the benefit of U.S. Provisional Application No. 60/255,545, filed Dec. 13, 2000.

BACKGROUND OF THE INVENTION

1. Technical Field

The present invention relates generally to motor vehicles and, more particularly, to a 120 volt alternating current (AC) surface mounted receptacle for a motor vehicle.

2. Discussion

Operators of cargo carrying vehicles such as Class 7 and Class 8 tractor-trailers find themselves far away from home a large portion of the time. As such, many of these vehicles are equipped with sleeper cabs to allow the operator to rest within the vehicle during a stationary period. Accordingly, it is desirable to equip such vehicles with wiring systems to allow use of common household electrical devices such as lap top computers, microwaves, televisions and the like. A similar need exists for access to a telephone while traveling. Accordingly, a wiring system for providing 120 volts AC and a telephone line may be beneficial to an operator.

Some manufacturers have attempted to fulfill the need for on board 120 volt AC wiring, but these early designs may be improved upon. For example, one system includes wiring internal to the truck walls with receptacle boxes mounted within the wall. This method of wiring is very similar to residential construction. Unfortunately, due to the small space provided between the vehicle cabin inner panels and outer panels, it is impractical to mount the large receptacle boxes inside of the wall.

Other attempts to route 120 volt wiring are found in commercial buildings. Surface mounted receptacles are used in compliance with raceways to conceal the wires. The raceways are externally mounted structures having a channel to route the wires. However, raceway systems are not feasible for use with truck interiors due to the many curved surfaces of the interior. In addition, many of the raceway systems utilize standard duplex receptacles. Assembly personnel may require special training if these type of receptacles are to be implemented.

Yet another commercially available device includes a duplex receptacle along with a television jack or a telephone jack. The wires may either be routed through the wall on which the receptacle box is mounted or out of the bottom of the box into the vehicle cabin. This device is supplied pre-wired with five to ten feet of wire extending from the receptacle. The assembly of such a device requires the installer to feed the entire length of wire through a small hole behind the receptacle box before routing through the remainder of the cab. Additionally, the back of the box is open providing a potential for installers to contact live wires during the installation process. Another shock hazard exists when the wires are run through the wall out of the back of the receptacle box. The existing product leaves an open hole at the bottom of the receptacle box and provides unwarranted access to live wires inside the box. This hazard exists after the box is mounted.

Furthermore, some competitive devices require an installer to machine geometrical shapes such as square apertures or keyhole slots. Costly, non-standard tools may be required to properly install these devices. Also, some existing products require a first installer to access one side of a panel and a second installer to access the opposing surface of the panel at the same time. Therefore, improvements in the field of surface mounted receptacles may be made.

SUMMARY OF THE INVENTION

The present invention includes a surface mounted receptacle assembly for use in a motor vehicle having a cabin. The receptacle assembly includes a cover, a mounting plate adapted to be mounted to the vehicle, a wire harness and a backing plate removably secured to the cover to conceal at least a portion of the wire harness. The cover is selectively attachable to the mounting plate.

DETAILED DESCRIPTION OF THE PREFERRED EMBODIMENTS

Figure 1:
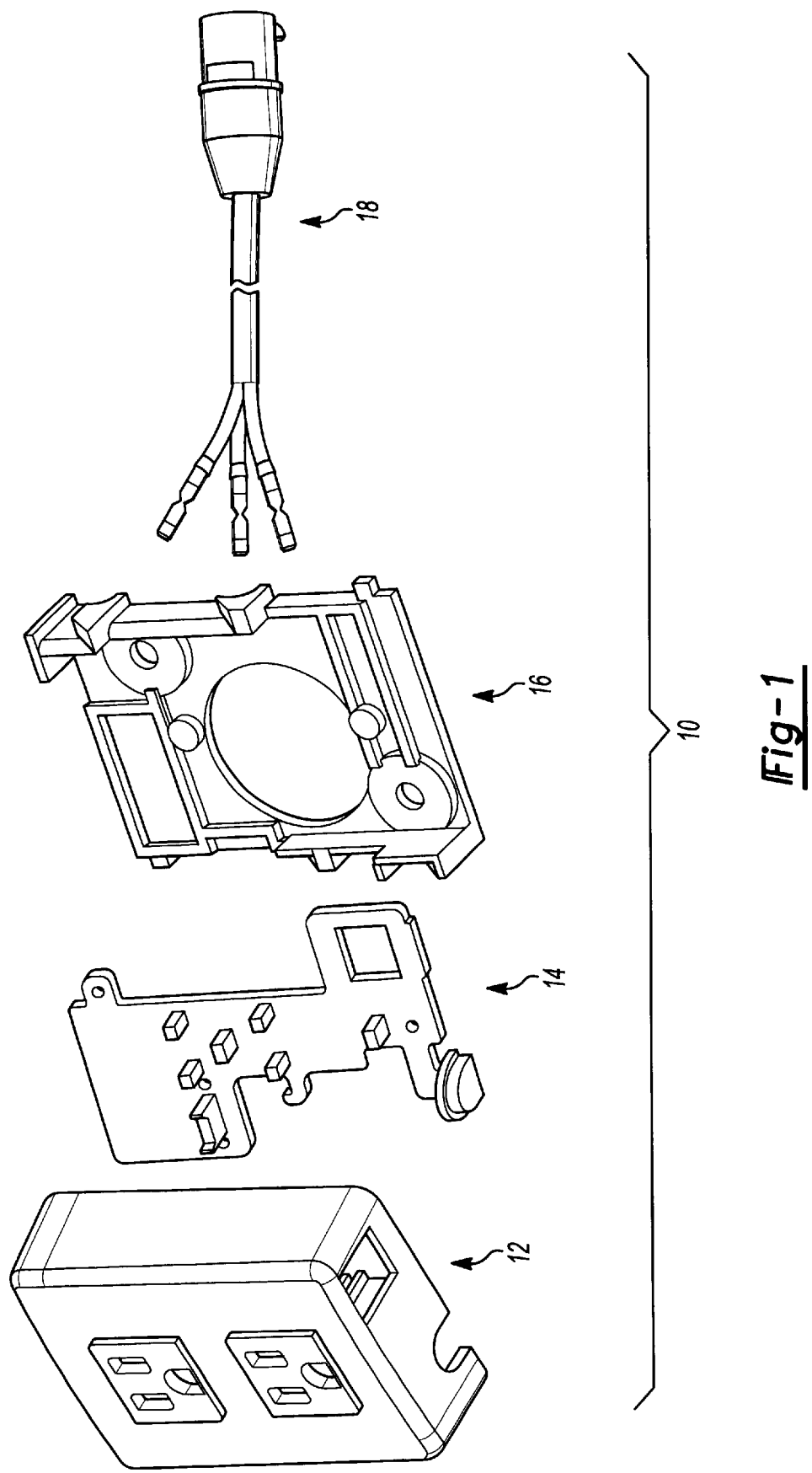
FIG. 1 is an exploded perspective view of a surface mounted receptacle assembly constructed in accordance with the teachings of the present invention.

With reference to FIG. 1, a surface mounted receptacle assembly constructed in accordance with the teachings of the present invention is generally identified at reference numeral 10. Receptacle assembly 10 includes a cover 12, a backing plate 14, a mounting plate 16 and a wire harness 18. As will be discussed in greater detail hereinafter, cover 12, backing plate 14 and wire harness 18 are interconnected to form a subassembly prior to installation on a vehicle. Accordingly, each of the wiring connections within receptacle assembly 10 are completed at the factory prior to shipment. It should be appreciated that each of cover 12, backing plate 14 and mounting plate 16 are preferably constructed from a light weight moldable material such as polycarbonate ABS.

Figure 2:
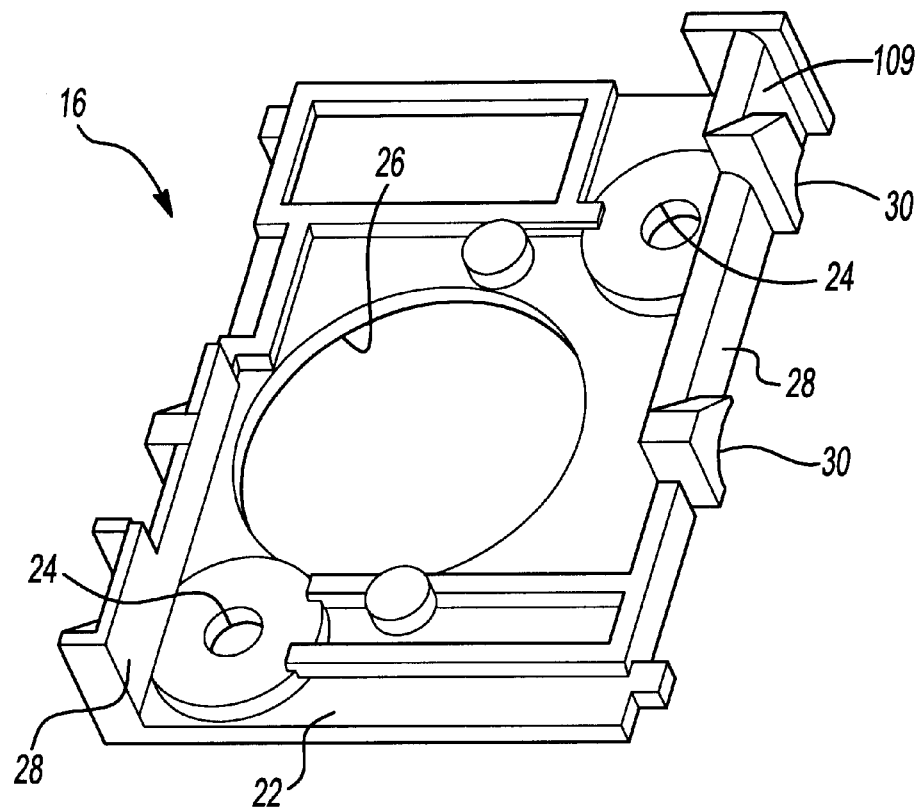
FIG. 2 is a perspective view of a mounting plate of the preferred surface mounted receptacle assembly.

With reference to FIG. 2, mounting plate 16 includes a generally planar body 22 for a flush mount to an inner wall of a vehicle cabin (not shown). Body 22 includes a pair of fastener apertures 24 and a wire aperture 26. If wire harness 18 is to be routed through the vehicle inner panel immediately behind receptacle assembly 10, a one and one quarter inch diameter hole is drilled through the vehicle panel to align with wire aperture 26. If wire harness 18 is to be routed within the cab for some initial distance, the one and one-quarter inch diameter hole is not machined. Regardless of the preferred wire routing, two small holes are drilled through the cabin wall at the locations of fastener apertures 24. If the wall material is of such sufficient strength, standard sheet metal screws may be utilized to fix mounting plate 16 to the vehicle inner panel. Otherwise, hollow wall fasteners such as wellnuts may be implemented.

Figure 3:
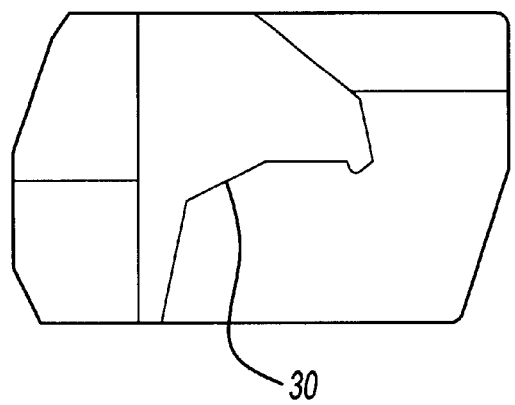
FIG. 3 is an enlarged side view of the mounting plate of the present invention.

Mounting plate 16 also includes a pair of rails 28 extending substantially orthogonally from body 22. As shown in FIG. 3, each of rails 28 includes a pair of detents 30 formed therein. As will be described in greater detail hereinafter, detents 30 retain cover 12 to mounting plate 16 without the use of external fasteners.

Figure 4:
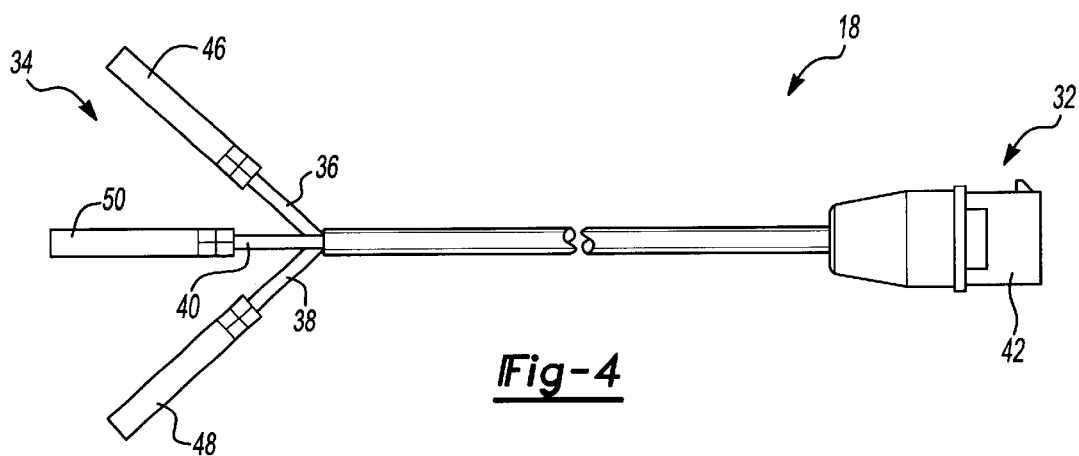
FIG. 4 is a plan view of the wire harness of the present invention.
Figure 5:
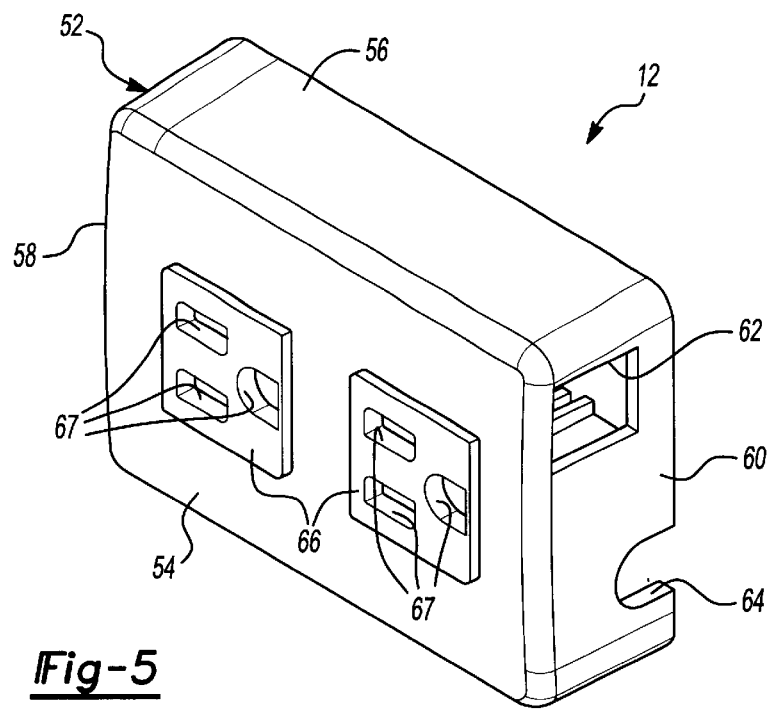
FIG. 5 is a perspective view of a cover constructed in accordance with the teachings of the present invention.
Figure 6:
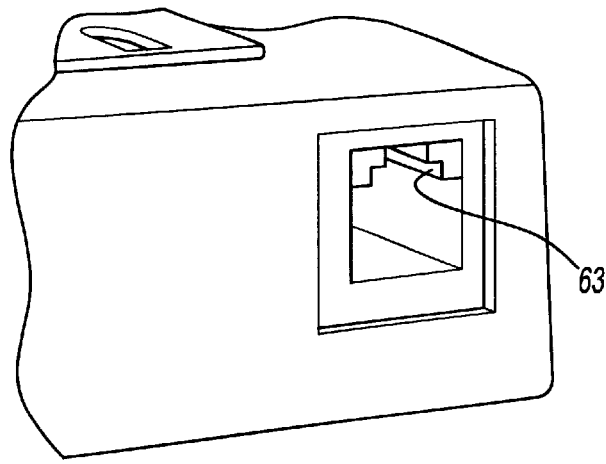
FIG. 6 is a partial perspective view depicting the cover, and a telephone jack of the present invention.
Figure 12:
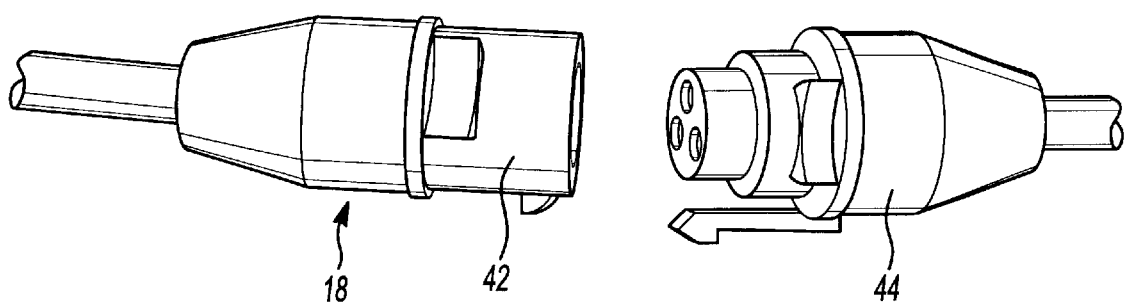
FIG. 12 is a perspective view depicting two wiring harnesses of the present invention.

As shown in FIG. 4, wire harness 18 has a first end 32 and a second end 34 interconnected by a first wire 36, a second wire 38 and a third wire 40. First end 32 includes an electrical connector 42 having male terminals mounted therein for simplified interconnection with another wiring harness 44 shown in FIG. 12. Wire harness 44 is selectively electrically coupled to a power source (not shown). At second end 34, first terminal 46 is electrically coupled to first wire 36. A second terminal 48 is electrically coupled to second wire 38. Finally, a third terminal 50 is electrically coupled to third wire 40.

FIGS. 5–8 depict cover 12 as a molded component preferably constructed from light weight polycarbonate ABS. As such, cover 12 may be molded in a variety of colors. Cover 12 is formed in the shape of a hollow shell 52 having a front face 54, two side walls 56, a top wall 58 and a bottom wall 60. If a telephone line interconnection is desired, a rectangular aperture 62 is formed in bottom wall 60 as cover 12 is molded. An optional telephone jack 63 is mounted to cover 12 to facilitate a standard telephone cord mounting. An arcuate aperture 64 is also formed within bottom wall 60 to provide a second possible routing path for wire harness 18 if so desired. Front face 54 includes a pair of bosses 66 extending outwardly therefrom to provide an appearance of a standard duplex receptacle. Each boss 66 includes three apertures 67 sized and positioned for receipt of a standard 120 volt AC male plug.

Figure 8:
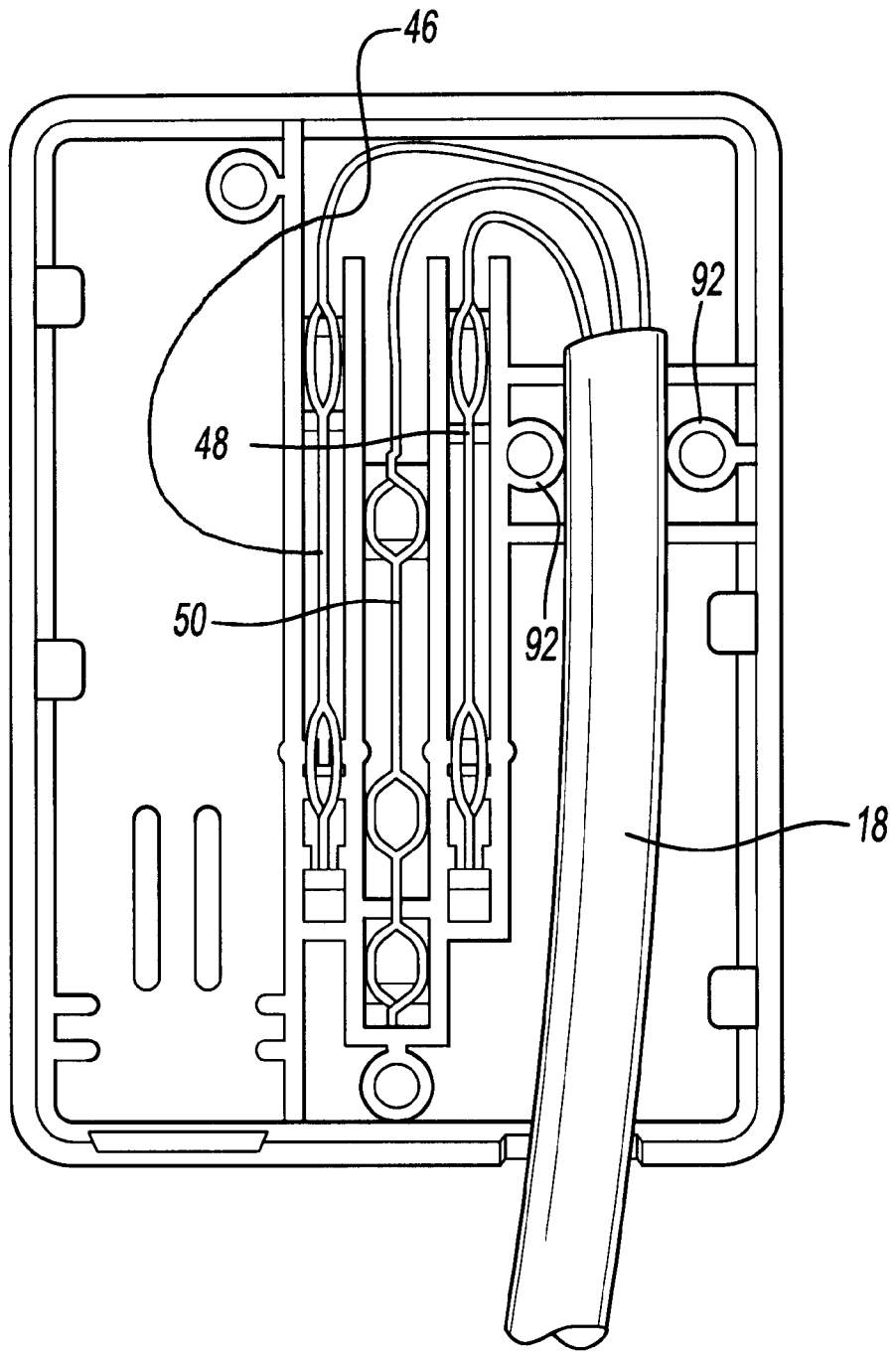
FIG. 8 is a partial assembly view of the wire harness to cover interconnection.

Cover 12 includes a plurality of ribs 68 extending inwardly from front face 54. A first set of ribs 70 defines a first slot 72 for receipt of first terminal 46 (FIG. 8). A second set of ribs 76 defines a second slot 78 for receipt of second terminal 48. First set of ribs 70 and second set of ribs 76 are spaced apart from one another to define a third slot 82. Third slot 82 is configured to receive third terminal 50. A high voltage barrier 86 extends from top wall 58 to bottom wall 60 to define a high voltage compartment to 88 and a low voltage compartment 90. A pair of bosses 92 and a pair of ribs 94 form a strain relief section 96. Wire harness 18 is displaced between bosses 92 such that external forces arising during handling or operation will not dislodge the terminals from their proper location or undesirably load the wire to terminal interconnection.

Figure 9:
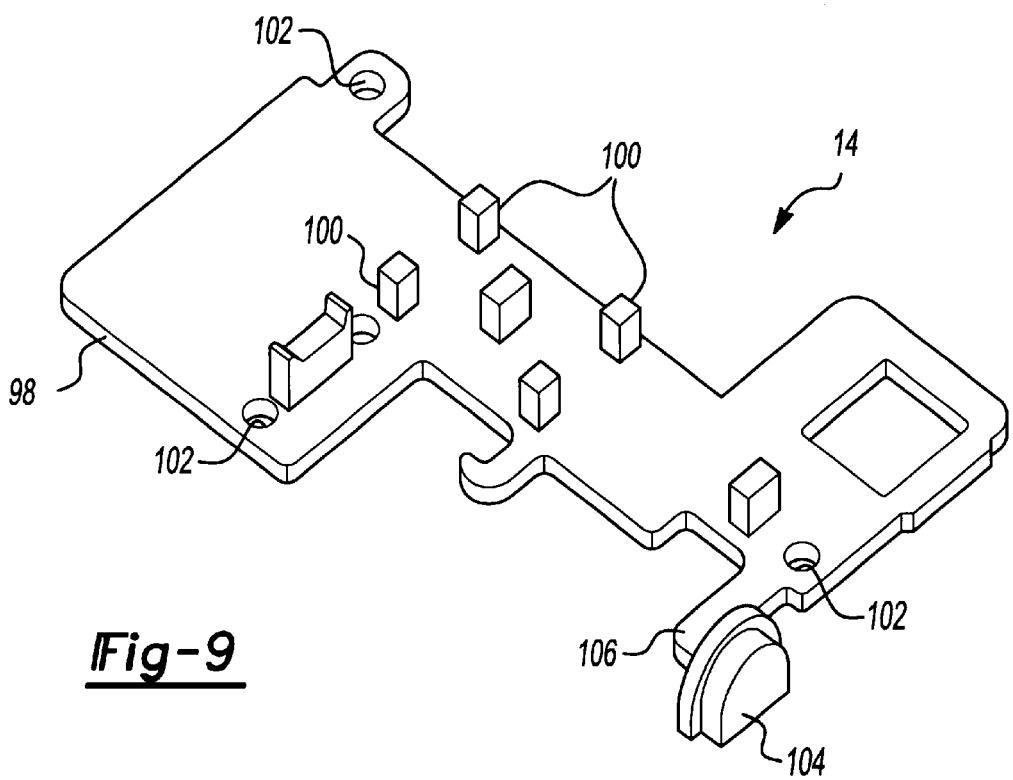
FIG. 9 is a perspective view of a backing plate of the surface mounted receptacle of the present invention.

FIG. 9 depicts backing plate 14 as including a substantially planar plate 98 having a plurality of tabs 100 projecting substantially orthogonally therefrom. Tabs 100 engage cavities defined by the bosses and ribs of cover 12 previously described. Backing plate 14 also includes a plurality of fastener apertures 102 for receipt of fasteners (not shown) interconnecting backing plate 14 and cover 12. Backing plate 14 has a lug 104 coupled to plate 98 via a web 106. Lug 104 is positioned and shaped to substantially fill arcuate aperture 64 within bottom wall 60. Lug 104 remains positioned within arcuate aperture 64 if wire harness 18 is to be routed along a first path through wire aperture 26 and the vehicle cabin wall. If wire harness 18 is to be routed through bottom wall 60 of cover 12, web 106 is cut to remove lug 104 thereby opening arcuate aperture 64.

Figure 7:
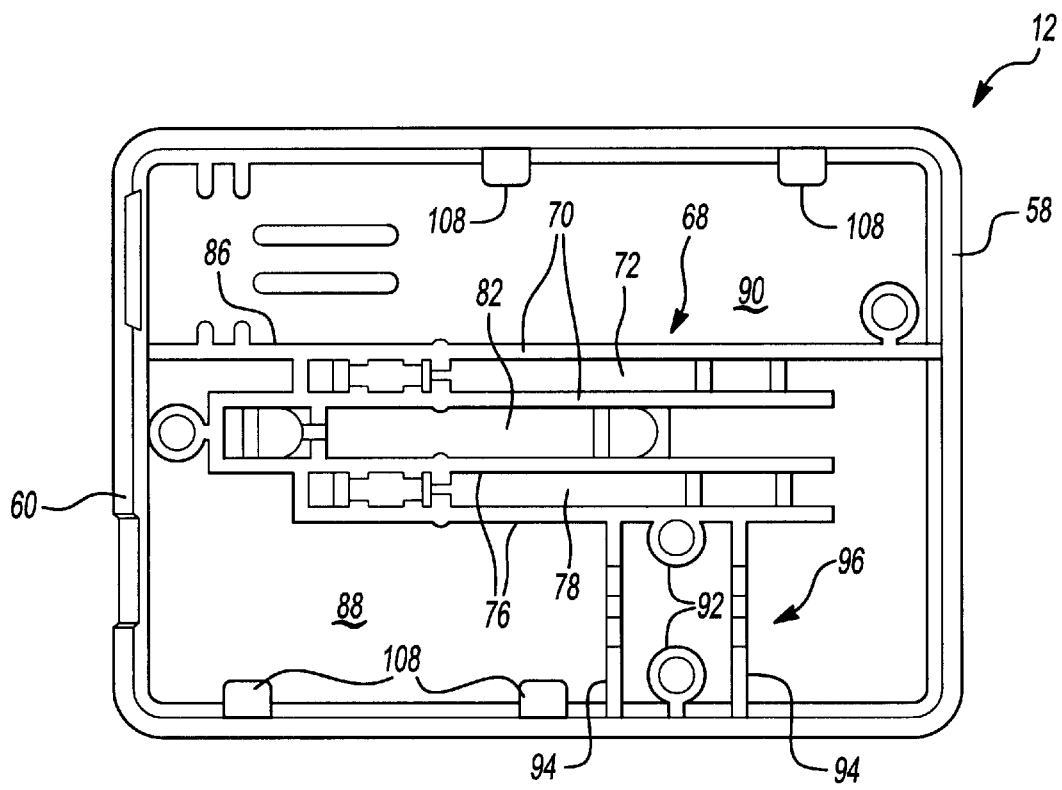
FIG. 7 is a plan view of an interior surface of the cover of FIG. 5.
Figure 10:
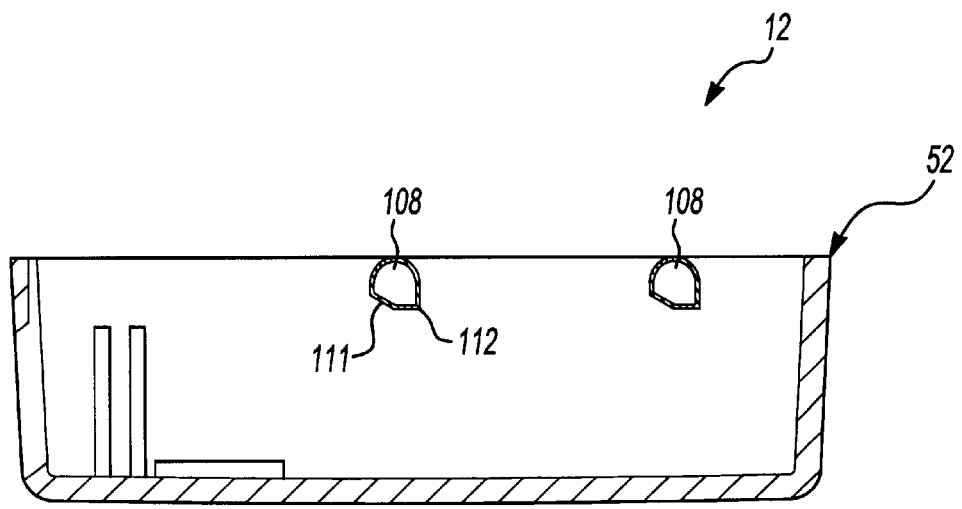
FIG. 10 is a partial cross-sectional side view of the cover of FIG. 5.
Figure 11:
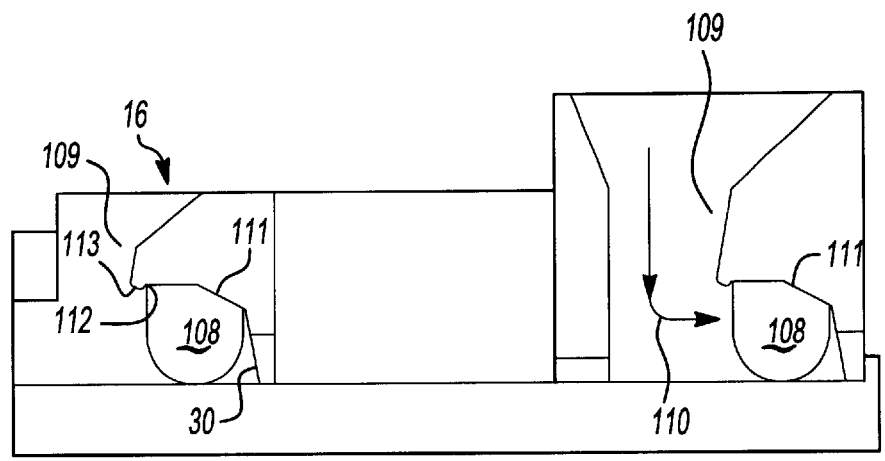
FIG. 11 is a partial assembly view depicting the interconnection of the mounting plate and the cover of the present invention.

With reference to FIGS. 7, 10 and 11, cover 12 includes four inwardly protruding pegs 108 for engagement with detents 30 of mounting plate 16. To couple cover 12 to mounting plate 16, each of pegs 108 is displaced down through a slot 109 formed within rail 28. Once pegs 108 are at the bottom slots 109, cover 12 is translated in the direction of arrow 110 (FIG. 7). Each peg 108 includes a chamfered surface 101 to assist in guiding peg 108 within detents 30. Peg 108 also includes a substantially square corner 112 for engagement with a cam 113 once peg 108 is entirely disposed within the detents 30. Depending on the tolerances of the components previously described, cam 113 may act to biasedly retain peg 108 within the detents 30. To disassemble cover 12 from mounting plate 16, force is applied to bottom wall 60 to disengage peg 108 and cam 113. Once peg 108 is displaced beyond detents 30, cover 12 may simply be removed by guiding pegs 108 through slots 109.

The foregoing discussion discloses and describes an exemplary embodiment of the present invention. One skilled in the art will readily recognize from such discussion and from the accompanying drawings and claims, that various changes, modifications and variations can be made therein without departing from the true spirit and fair scope of the invention as defined by the following claims.

What is claimed is:

1. A surface mounted receptacle assembly for use in a motor vehicle having a cabin with an interior wall, the receptacle assembly comprising:
    a cover;
    a mounting plate adapted to be mounted to the interior wall;
    a wire harness having a first end and a second end, said second end coupled to said cover, said first end adapted to be coupled to a power source, said second end accessible through apertures in said cover; and
    a backing plate removably secured to said cover to conceal said second end of said wire harness wherein said cover is selectively attachable to said mounting plate by an attachment mechanism, said cover obscuring said attachment mechanism and said mounting plate from view within the vehicle cabin.

2. The receptacle assembly of claim 1 wherein one of said cover and said mounting plate includes a set of pegs and the other of said cover and said mounting plates includes a set of detents corresponding to said pegs, wherein said pegs are selectively disposable within said detents to couple said cover to said mounting plate.

3. The receptacle assembly of claim 2 wherein one of said detents includes a cam biasedly engaging one of said pegs to retain said peg within said detent.

4. The receptacle assembly of claim 3 wherein one of said pegs is axially displaced within a slat positioned within one of said cover and said mounting plate prior to being transversely disposed within one of said detents.

5. The receptacle assembly of claim 1 wherein said cover, mounting plate and backing plate are molded from an electrically resistant plastic.

6. The receptacle assembly of claim 1 further including a telephone jack coupled to said cover, wherein said cover includes an aperture providing access to said telephone jack.

7. The receptacle assembly of claim 1 wherein said mounting plate includes an aperture for mounting said wire harness therethrough along a first route.

8. A surface mounted receptacle assembly for use in a motor vehicle having a cabin comprising:
- a mounting plate adapted to be mounted to the vehicle; and
- a module having a cover, a wire harness and a backing plate wherein said wire harness is mounted within a cavity formed within said cover and wherein said backing plate is coupled to said cover to enclose said cavity, said module being removably coupled to said mounting plate by an attachment mechanism, said cover concealing said attachment mechanism and said mounting plate from view within the vehicle cabin.

9. The receptacle assembly of claim 8 wherein said module is coupled to said mounting plate without the use of additional fasteners.

10. The receptacle assembly of claim 9 wherein said mounting plate engages said module in a snap-fit arrangement.

11. The receptacle assembly of claim 8 wherein no receptacle assembly fasteners are visible from within the vehicle cabin.

12. The receptacle assembly of claim 8 further including a telephone jack mounted within said cavity and wherein said cover includes an aperture providing external access to said telephone jack.

13. The receptacle assembly of claim 8 wherein one of said module and said mounting plate includes a peg and the other of said module and said mounting plate includes a detent, wherein said peg is selectively disposable within said detent to couple said module to said mounting plate.

14. The receptacle assembly of claim 13 wherein said detent includes a cam for capturing said peg within said detent.

15. The receptacle assembly of claim 13 wherein said peg is biasedly engaged with said detent.

16. A surface mounted receptacle assembly for use in a motor vehicle having a cabin with an interior wall, the receptacle assembly comprising:
- a cover;
- a mounting plate adapted to be mounted to the interior wall;
- a wire harness having a first and a second end, said second end coupled to said cover, said first end adapted to be coupled to a power source, said second end accessible through apertures in said cover; and
- a backing plate removably secured to said cover to conceal said second end of said wire harness, said cover being selectively attachable to said mounting plate, one of said cover and said mounting plate including a set of pegs and the other of said cover and said mounting plates including a set of detents corresponding to said pegs, said pegs being selectively disposable within said detents to couple said cover to said mounting plate, and one of said detents including a cam biasedly engaging one of said pegs to retain said peg within said detent.

17. The receptacle assembly of claim 16 wherein one of said pegs is axially displaced within a slot positioned within one of said cover and said mounting plate prior to being transversely disposed within one of said detents.

18. A surface mounted receptacle assembly for use in a motor vehicle having a cabin comprising:
- a mounting plate adapted to be mounted to the vehicle; and
- a module having a cover, a wire harness and a backing plate, said wire harness being mounted within a cavity formed within said cover, said backing plate being coupled to said cover to enclose said cavity, said module being removably coupled to said mounting plate, wherein one of said module and said mounting plate includes a peg and the other of said module and said mounting plate includes a detent, said peg being selectively disposable within said detent to couple said module to said mounting plate and said peg being biasedly engaged with said detent.

19. A surface mounted receptacle assembly for use in a motor vehicle having a cabin with an interior wall, the receptacle assembly comprising:
- a cover;
- a mounting plate adapted to be mounted to the interior wall;
- a wire harness having a first end and a second end, said second end coupled to said cover, said first end adapted to be coupled to a power source, said second end accessible through apertures in said cover; and
- a backing plate removably secured to said cover to conceal said second end of said wire harness, said cover being selectively attachable to said mounting plate, wherein said second end of said wire harness includes a plurality of terminals and wherein said cover includes a plurality of ribs defining slots for receipt of said terminals.

20. The receptacle assembly of claim 19 wherein said apertures formed in said cover are aligned with said plurality of terminals and wherein said apertures are positioned in predetermined patterns to facilitate electrical interconnection with a 120 volt AC plug.

21. A surface mounted receptacle assembly for use in a motor vehicle having a cabin with an interior wall, the receptacle assembly comprising:
- a cover;
- a mounting plate adapted to be mounted to the interior wall;
- a wire harness having a first end and a second end, said second end coupled to said cover, said first end adapted to be coupled to a power source, said second end accessible through apertures in said cover; and
- a backing plate removably secured to said cover to conceal said second end of said wire harness, said cover being selectively attachable to said mounting plate, said mounting plate including an aperture for mounting said wire harness therethrough along a first route, said backing plate including a selectively removable lug, said cover including an aperture shaped to compliment the shape of said lug, wherein said lug is positioned within said aperture if a first wire harness routing is desired and wherein said lug is removed if a second wire harness routing through said lug aperture is desired.

22. A surface mounted receptacle assembly for use in a motor vehicle having a cabin comprising:
- a mounting plate adapted to be mounted to the vehicle; and
- a module having a cover, a wire harness and a backing plate, said wire harness being mounted within a cavity formed within said cover, said backing plate being coupled to said cover to enclose said cavity, said module being removably coupled to said mounting plate, said backing plate including a selectively removable lug and said cover including an aperture shaped to compliment the shape of said lug, wherein said lug is positioned within said aperture if a first wire harness routing is desired and wherein said lug is removed if a second wire harness routing through said lug aperture is desired.

23. A surface mounted receptacle assembly for use in a motor vehicle having a cabin comprising:

a mounting plate adapted to be mounted to the vehicle; and a module having a cover, a wire harness and a backing plate, said wire harness being mounted within a cavity formed within said cover, said backing plate being coupled to said cover to enclose said cavity, said module being removably coupled to said mounting plate, said cover including a rib extending the length of the cover dividing said cavity into a low voltage portion and a high voltage portion, said wire harness being positioned within said high voltage portion.

* * * * *

UNITED STATES PATENT AND TRADEMARK OFFICE
CERTIFICATE OF CORRECTION

PATENT NO. : 6,644,987 B2  Page 1 of 1
DATED : November 11, 2003
INVENTOR(S) : Michael Meleck It is certified that error appears in the above-identified patent and that said Letters Patent is hereby corrected as shown below:

Title page,
Item [56], References Cited, U.S. PATENT DOCUMENTS, please add:
-- 2,552,061   05/1951
5,255,767    10/1993    Norwood
5,308,253    05/1994    Maki
6,234,846    05/2001    Lemut
6,301,792    10/2001    Speer
6,485,327    11/2002    Morlock --

Column 4,
Line 59, "slat" should be -- slot --.

Signed and Sealed this

Sixteenth Day of March, 2004

JON W. DUDAS
*Acting Director of the United States Patent and Trademark Office*